US012367767B2

(12) United States Patent
Kim

(10) Patent No.: US 12,367,767 B2
(45) Date of Patent: Jul. 22, 2025

(54) PLATOONING CONTROL APPARATUS AND METHOD THEREOF

(71) Applicants: Hyundai Motor Company, Seoul (KR); Kia Corporation, Seoul (KR)

(72) Inventor: Hyung Mook Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 314 days.

(21) Appl. No.: 17/845,289

(22) Filed: Jun. 21, 2022

(65) Prior Publication Data
US 2023/0154326 A1 May 18, 2023

(30) Foreign Application Priority Data
Nov. 15, 2021 (KR) .................. 10-2021-0156941

(51) Int. Cl.
*G08G 1/00* (2006.01)
*G08G 1/0967* (2006.01)

(52) U.S. Cl.
CPC ......... *G08G 1/096791* (2013.01); *G08G 1/22* (2013.01)

(58) Field of Classification Search
CPC ............ G08G 1/09675; G08G 1/22; G08G 1/096775; G08G 1/096791; G08G 1/096725; B60W 30/04; B60W 40/02; B60W 40/13; B60W 2040/1307; B60W 2555/20; B60W 2030/043; B60W 2556/65; G05D 1/0293
See application file for complete search history.

(56) References Cited

U.S. PATENT DOCUMENTS

| 5,825,284 | A * | 10/1998 | Dunwoody | B61F 5/245 340/440 |
| 10,500,975 | B1 * | 12/2019 | Healy | B60K 6/48 |
| 11,136,021 | B1 * | 10/2021 | Funke | B62D 7/159 |
| 11,952,010 | B1 * | 4/2024 | Roy | B62D 15/021 |
| 2008/0208416 | A1 * | 8/2008 | Yuet | B60W 30/04 340/440 |
| 2008/0281487 | A1 * | 11/2008 | Milot | B60W 30/04 701/1 |

(Continued)

FOREIGN PATENT DOCUMENTS

JP        2014154032  A  *  8/2014

OTHER PUBLICATIONS

Machine Translation of the Description of JP 2014154032 A, Osawa et al. pp. 1-8 (Year: 2014).*

*Primary Examiner* — Anne Marie Antonucci
*Assistant Examiner* — Jared C Bean
(74) *Attorney, Agent, or Firm* — Fox Rothschild LLP

(57) ABSTRACT

A platooning control apparatus for preventing a vehicle from rollover and a method thereof are provided. A communication device provided in a vehicle which is platooning transmits and receives platooning information and information about a risk of rollover of the vehicle due to crosswind with at least one of other vehicles in a string of the vehicle or an external server. A processor performs formation control for preventing at least one of the vehicle or the other vehicles in the string from rollover. An autonomous vehicle in which a driver does not ride is prevented from rollover to ensure stability of autonomous driving.

16 Claims, 15 Drawing Sheets

(56) References Cited

U.S. PATENT DOCUMENTS

| | | | |
|---|---|---|---|
| 2013/0151075 A1* | 6/2013 | Moshchuk | B60G 17/016 701/1 |
| 2014/0008132 A1* | 1/2014 | Kamamann | B60T 8/1725 177/136 |
| 2016/0054735 A1* | 2/2016 | Switkes | G05D 1/0217 701/23 |
| 2018/0093655 A1* | 4/2018 | Healy | B60L 1/003 |
| 2019/0346862 A1* | 11/2019 | Switkes | G05D 1/0217 |
| 2020/0057453 A1* | 2/2020 | Laws | G05D 1/0088 |
| 2021/0370973 A1* | 12/2021 | Kazuyuki | B60W 60/0017 |
| 2021/0402984 A1* | 12/2021 | Funke | B62D 7/06 |
| 2023/0104727 A1* | 4/2023 | Oda | B60W 10/20 701/93 |

\* cited by examiner

PLATOONING CONTROL APPARATUS AND METHOD THEREOF

CROSS-REFERENCE TO RELATED APPLICATION

This application claims under 35 U.S.C. § 119(a) the benefit of Korean Patent Application No. 10-2021-0156941, filed in the Korean Intellectual Property Office on Nov. 15, 2021, the entire contents of which are incorporated herein by reference.

BACKGROUND

Technical Field

Embodiments of the present disclosure relate to a platooning control apparatus and a method thereof, and more particularly, relates to a platooning control apparatus for preventing a vehicle from rollover and a method thereof.

Description of the Related Art

First of all, an autonomous truck in which a driver does not ride may include a rear trailer part for loading cargo and a front tractor part, which are coupled to each other. When a strong crosswind suddenly blows while the autonomous truck is traveling, the trailer part with a wide area can overturn along with the tractor part coupled to the trailer part. Thus, the autonomous truck may be dangerous. Particularly, when the trailer part is light, roll due to crosswind may occur severely.

Furthermore, an autonomous vehicle may perform platooning using a sensor loaded into the autonomous vehicle and information collected through vehicle to everything (V2X) communication. Platooning may be needed for efficient autonomous driving of the autonomous vehicle. Autonomous vehicles may maintain a string by means of platooning to perform autonomous driving. Furthermore, an existing string may change to a string suitable for a situation by means of a predetermined algorithm to perform platooning. Thus, there is a need to develop a technology for performing formation control for preventing a risk of rollover of an autonomous truck which is platooning due to crosswind, using a platooning technology.

SUMMARY

Embodiments of the present disclosure are configured to address the above-mentioned problems occurring in existing technologies while advantages achieved by the existing technologies are maintained intact.

An embodiment of the present disclosure provides a platooning control apparatus configured to prevent a vehicle from rollover and a method thereof.

Another embodiment of the present disclosure provides a platooning control apparatus configured to allow a vehicle to detect crosswind by itself and coping with the detected crosswind in advance and a method thereof.

Another embodiment of the present disclosure provides a platooning control apparatus configured to prevent an autonomous vehicle in which the driver does not ride from rollover to ensure stability of autonomous driving and a method thereof.

Another embodiment of the present disclosure provides a platooning control apparatus configured to prevent a vehicle from rollover by means of platooning to enhance efficiency of the platooning and a method thereof.

Another embodiment of the present disclosure provides a platooning control apparatus configured to prevent an autonomous truck from rollover by means of a trailer part of the autonomous truck to enhance usability of the autonomous truck and a method thereof.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a platooning control apparatus may include a communication device provided in a vehicle that is platooning and configured to transmit and receive platooning information and information about a risk of rollover of the vehicle due to a crosswind with at least one of other vehicle in a string of vehicles or an external server and a processor configured to perform formation control for preventing at least one of the vehicle or the other vehicles in the string from rollover.

In an embodiment, each of the vehicle and the other vehicles in the string may include a trailer part. The processor may be configured to determine a risk of rollover of each of the vehicle and the other vehicles based on a weight of the trailer part of each of the vehicle and the other vehicles.

In an embodiment, the processor may be configured to perform formation control such that the vehicle is located in a direction where the crosswind blows with respect to another vehicle determined as having the highest risk of rollover among the other vehicles in the string to platoon and prevents the crosswind applied to the other vehicle.

In an embodiment, the processor may be configured to perform formation control for preventing the crosswind when the vehicle is a vehicle determined as having the lowest risk of rollover among vehicles in the string.

In an embodiment, each of the vehicle and the other vehicles in the string may include a trailer part. The processor may be configured to determine whether the vehicle and the other vehicles reach a rollover critical point based on a weight applied to each wheel of the trailer part of each of the vehicle and the other vehicles.

In an embodiment, the processor may be configured to determine that a vehicle determined that a weight applied to left wheels of the trailer part or a weight applied to right wheels of the trailer part is "0" reaches the rollover critical point.

In an embodiment, the processor may be configured to perform formation control such that the vehicle is located in a direction where the other vehicle which reaches the rollover critical point overturns due to the crosswind with respect to the other vehicle which reaches the rollover critical point among the other vehicles in the string to platoon and blocks the other vehicle from rollover.

In an embodiment, the processor may be configured to perform formation control for blocking the other vehicle from rollover when the vehicle is a vehicle determined as having the second lowest risk of rollover among vehicles in the string.

In an embodiment, the processor may be configured to perform the formation control for blocking the other vehicle from rollover to maintain a range determined that a distance to a line adjacent in the direction of the other vehicle which reaches the rollover critical point with respect to the vehicle is the same as a distance to a line adjacent in the direction of the vehicle with respect to the other vehicle which reaches the rollover critical point and that a driving speed of the vehicle and a driving speed of the other vehicle which reaches the rollover critical point are the same as each other.

In an embodiment, the vehicle may include a trailer part. The platooning control apparatus may further include a wheel weight sensor that is configured to sense a weight applied to each wheel of the trailer part and a camera that is configured to obtain an image in front of the vehicle. The processor may be configured to determine whether the vehicle is going straight based on the image in front of the vehicle and to compare a weight applied to left wheels of the trailer part with a weight applied to right wheels of the trailer part, and to determine at least one of whether a crosswind occurs or a direction of the crosswind, when it is determined that the vehicle is going straight in a state where a road where the vehicle is traveling is flat.

In an embodiment, the platooning control apparatus may further include a steering angle sensor that is configured to obtain a steering angle of the vehicle. The processor may be configured to determine at least one of whether a crosswind occurs or a direction of the crosswind, with regard to the steering angle.

According to another embodiment of the present disclosure, a platooning control method may include transmitting and receiving, by a communication device provided in a vehicle which is platooning, platooning information and information about a risk of rollover of the vehicle due to a crosswind with at least one of other vehicles in a string of the vehicle or an external server and performing, by a processor, formation control for preventing at least one of the vehicle or the other vehicles in the string from rollover.

In an embodiment, each of the vehicle and the other vehicles in the string may include a trailer part. The platooning control method may further include determining, by the processor, a risk of rollover of each of the vehicle and the other vehicles, based on a weight of the trailer part of each of the vehicle and the other vehicles.

In an embodiment, performing the formation control for preventing the at least one of the vehicle or the other vehicles in the string from rollover may further include performing, by the processor, formation control such that the vehicle is located in a direction where the crosswind blows with respect to another vehicle determined as having the highest risk of rollover among the other vehicles in the string to platoon and prevents the crosswind applied to the other vehicle.

In an embodiment, each of the vehicle and the other vehicles in the string may include a trailer part. The platooning control method may further include determining, by the processor, whether the vehicle and the other vehicles reach a rollover critical point based on a weight applied to each wheel of the trailer part of each of the vehicle and the other vehicles.

In an embodiment, determining whether the vehicle and the other vehicles reach the rollover critical point may include determining, by the processor, that a vehicle determined that a weight applied to left wheels of the trailer part or a weight applied to right wheels of the trailer part is "0" reaches the rollover critical point.

In an embodiment, performing the formation control for preventing the at least one of the vehicle or the other vehicles in the string from rollover may include performing, by the processor, formation control such that the vehicle is located in a direction where the other vehicle which reaches the rollover critical point overturns due to the crosswind with respect to the other vehicle which reaches the rollover critical point among the other vehicles in the string to platoon and blocks the other vehicle from rollover.

In an embodiment, performing the formation control such that the vehicle is located in the direction where the other vehicle which reaches the rollover critical point overturns due to the crosswind with respect to the other vehicle which reaches the rollover critical point among the other vehicles in the string to platoon and blocks the other vehicle from rollover may include performing, by the processor, the formation control for blocking the other vehicle from rollover to maintain a range determined that a distance to a line adjacent in the direction of the other vehicle which reaches the rollover critical point with respect to the vehicle is the same as a distance to a line adjacent in the direction of the vehicle with respect to the other vehicle which reaches the rollover critical point and that a driving speed of the vehicle and a driving speed of the other vehicle which reaches the rollover critical point are the same as each other.

In an embodiment, the vehicle may include a trailer part. The platooning control method may further include sensing, by a wheel weight sensor, a weight applied to each wheel of the trailer part. The method may also include obtaining, by a camera, an image in front of the vehicle. The method may further include determining, by the processor, whether the vehicle is going straight based on the image in front of the vehicle. The method may additionally include comparing, by the processor, a weight applied to left wheels of the trailer part with a weight applied to right wheels of the trailer part to determine at least one of whether a crosswind occurs or a direction of the crosswind, when it is determined that the vehicle is going straight in a state where a road where the vehicle is traveling is flat.

In an embodiment, the platooning control method may further include obtaining, by a steering angle sensor, a steering angle of the vehicle and determining, by the processor, at least one of whether a crosswind occurs or a direction of the crosswind, with regard to the steering angle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
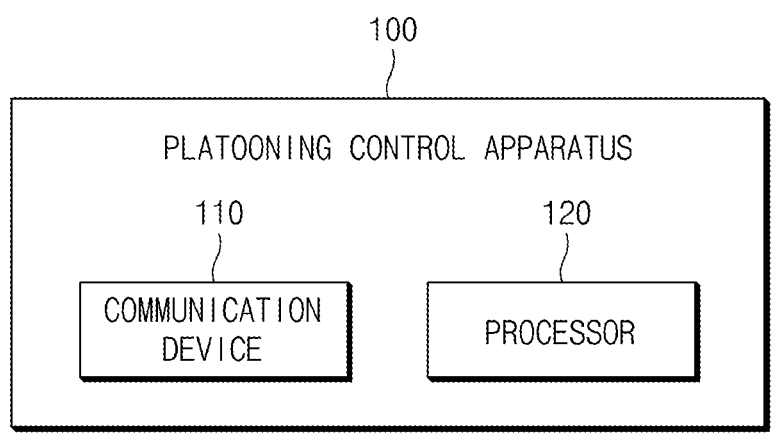
FIG. 1 is a block diagram illustrating a platooning control apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 15.

FIG. 1 is a block diagram illustrating a platooning control apparatus according to an embodiment of the present disclosure.

The platooning control apparatus 100 according to an embodiment of the present disclosure may be implemented inside or outside a vehicle. In this case, the platooning control apparatus 100 may be integrally configured with control units in the vehicle or may be implemented as a separate device to be connected with the control units of the vehicle by a connection means.

As an example, the platooning control apparatus 100 may be integrally configured with the vehicle or may be implemented as a separate configuration in the form of being installed/attached to the vehicle. Alternatively, a part of the platooning control apparatus 100 may be integrally configured with the vehicle and the other may be implemented as a separate configuration in the form of being installed/attached to the vehicle.

Referring to FIG. 1, the platooning control apparatus 100 may include a communication device 110 and a processor 120.

The communication device 110 may be provided in a host vehicle that is platooning and it may be configured to transmit and receive platooning information and information about a risk of rollover of the host vehicle due to a crosswind with at least one other vehicle in a string of vehicles or an external server.

As an example, the communication device 110 may communicate with the external server to receive platooning situation information or the like. The communication device 110 may transmit and receive data using various communication schemes. For example, the communication device 110 may use a wireless-fidelity (Wi-Fi®) scheme, a Bluetooth® scheme, a ZigBee® scheme, an ultra-wide band (UWB) scheme, or a near field communication (NFC) scheme.

As an example, the communication device 110 may be a hardware device implemented with various electronic circuits to transmit and receive a signal through a wireless or wired connection, which may perform communication between vehicles in the string through vehicle to everything (V2X) communication.

Each of the host vehicle and the other vehicle in the string may include a trailer part.

As an example, each of the host vehicle and the other vehicle in the string may include an autonomous truck including a tractor part and a trailer part.

Because the tractor part and the trailer part may be coupled to each other, when the trailer part with a wide cross section overturns due to a crosswind, the tractor part may also overturn.

The processor 120 may be electrically connected with the communication device 110 or the like and may be configured to electrically control the respective components. The processor 120 may be an electrical circuit which executes instructions of software and may be configured to perform a variety of data processing and calculation described below.

The processor 120 may be, for example, an electronic control unit (ECU), a micro controller unit (MCU), or another sub-controller that is loaded into the vehicle.

The processor 120 may be configured to perform formation control for preventing at least one of the host vehicle or the other vehicles in the string from rollover. This formation control may include at least one of formation control for placing another vehicle in a direction where a crosswind blows with respect to a specific vehicle to block the crosswind applied to the specific vehicle, or formation control for placing another vehicle in a direction where the specific vehicle overturns due to the crosswind with respect to the specific vehicle to block the specific vehicle from rollover.

As an example, the processor 120 may be configured to determine a risk of rollover of each of the host vehicle and the other vehicles based on a weight of a trailer part of each of the host vehicle and the other vehicles.

As an example, the processor 120 may be configured to determine that the larger the weight of the trailer part, the lower the risk to overturn due to the crosswind and to determine that the smaller the weight of the trailer part, the higher the risk to overturn due to the crosswind.

As an example, the processor 120 may be configured to perform formation control such that the host vehicle is located in a direction where the crosswind blows with respect to another vehicle determined as having the highest risk of rollover among the other vehicles in the string to platoon and blocks the crosswind applied to the other vehicle.

As an example, the platooning control apparatus 100 may further include a wheel weight sensor (not shown) which senses a weight applied to each wheel of the trailer part.

As an example, the platooning control apparatus 100 may be configured to calculate a weight of the trailer part by adding weights of the respective wheels, which are sensed by means of the wheel weight sensor (not shown).

As an example, the processor 120 may be configured to determine a vehicle having a trailer part with the smallest weight among vehicles in the string as a vehicle with the highest risk of rollover.

As an example, when the vehicle with the highest risk of rollover is present among the other vehicles in string, the processor 120 may be configured to perform formation control such that the host vehicle is located in the direction where the crosswind blows with respect to the vehicle with the highest risk of rollover to platoon.

When the host vehicle is located in the direction where the crosswind blows with respect to the vehicle with the highest risk of rollover to platoon, as the crosswind applied to the vehicle with the highest risk of rollover is blocked by the host vehicle located in the direction where the crosswind blows, the risk of rollover may be reduced.

As an example, when the host vehicle is a vehicle determined as having the lowest risk of rollover among the vehicles in the string, the processor 120 may be configured to perform formation control for blocking the crosswind.

As an example, when the host vehicle has a trailer part with the largest weight among the vehicles in the string, the processor 120 may be configured to determine that the host vehicle has the lowest risk of rollover in the vehicles in the string.

As an example, the processor 120 may be configured to determine whether the host vehicle and the other vehicles reach a rollover critical point, based on a weight applied to each wheel of trailer parts of the host vehicle and the other vehicles.

As an example, the processor 120 may be configured to determine that a vehicle determined that a weight applied to left wheels of the trailer part or a weight applied to right wheels of the trailer part is "0" reaches the rollover critical point.

As an example, when it is determined (e.g., the processor 120) that a value obtained by adding weights applied to the left wheels among weights of the respective wheels, which are sensed by means of the wheel weight sensor (not shown), or a value obtained by adding weights applied to the right wheels among the weights of the respective wheels, which are sensed by means of the wheel weight sensor (not shown) is "0", the platooning control apparatus 100 may be configured to determine that the corresponding vehicle reaches the rollover critical point.

As an example, the processor 120 may be configured to perform formation control such that the host vehicle is located in a direction where another vehicle that reaches the rollover critical point overturns due to the crosswind with respect to the other vehicle which reaches the rollover critical point among the other vehicles in the string to platoon and blocks the other vehicle from rollover.

As an example, when the host vehicle is a vehicle determined as having the second lowest risk of rollover among the vehicles in the string, the processor 120 may be configured to perform formation control for blocking rollover.

As an example, the processor 120 may be configured to perform formation control such that the host vehicle approaches close to a direction where another vehicle which reaches the rollover critical point overturns due to the crosswind with respect to the other vehicle which reaches the rollover critical point by a predetermined distance to platoon and blocks the other vehicle from rollover.

As an example, when the host vehicle has a trailer part with the second largest weight among the vehicles in the string, the processor 120 may be configured to determine that the host vehicle has the second lowest risk of rollover in the vehicles in the string.

As an example, the processor 120 may be configured to perform formation control for blocking rollover to maintain a range determined that a distance to a line adjacent in the direction of another which reaches the rollover critical point with respect to the host vehicle is the same as a distance to a line adjacent in the direction of the host vehicle with respect to the other vehicle which reaches the rollover critical point and that a driving speed of the host vehicle and a driving speed of the other vehicle which reaches the rollover critical point are the same as each other.

As an example, the platooning control apparatus 100 may further include a camera (not shown) be configured to obtain at least one image in front of the host vehicle.

As an example, the camera (not shown) may include at least one of a surround view monitor (SVM) camera, a digital video recording system (DVRS) camera, a camera monitor system (CMS) camera, or a line detection camera.

As an example, the processor 120 may be configured to determine a distance to a line adjacent in the direction of another vehicle which reaches the rollover critical point with respect to the host vehicle and to determine a distance to a line adjacent in the direction of the host vehicle with respect to the other vehicle which reaches the rollover critical point, based on the image in front of the host vehicle, which is obtained by the camera.

As an example, the processor 120 may be configured to determine whether the host vehicle is going straight, based on the image in front of the host vehicle. When it is determined that the host vehicle is going straight in a state where the road where the host vehicle is traveling is flat, the processor 120 may be configured to compare a weight applied to the left wheels of the trailer part with a weight applied to the right wheels of the trailer part to determine at least one of whether a crosswind occurs or a direction of the crosswind.

As an example, the processor 120 may be configured to determine whether a distance from the center of the vehicle to a left line of a lane where the host vehicle is traveling and a distance from the center of the vehicle to a right line of the lane where the host vehicle is traveling remain the same, by means of the image in front of the host vehicle.

As an example, when it is determined (e.g., by the processor 120) that the distance from the center of the host vehicle to the left line of the lane where the host vehicle is traveling and the distance from the center of the host vehicle to the right line of the lane where the host vehicle is traveling remain the same, the processor 120 may determine that the host vehicle is going straight.

As an example, the processor 120 may be configured to identify whether the road where the vehicle is currently traveling is flat based upon navigation map information, or to determine whether the road is flat using a sensor provided in the vehicle.

As an example, when a difference between the weight applied to the left wheels of the trailer part or the weight applied to the right wheels of the trailer part is greater than a predetermined threshold, the processor 120 may be configured to determine that a crosswind occurs.

As an example, when the weight applied to the left wheels of the trailer part is greater than the weight applied to the right wheels of the trailer part, the processor 120 may be configured to determine that the crosswind blows from the right to the left. When the weight applied to the right wheels of the trailer part is greater than the weight applied to the left wheels of the trailer part, the processor 120 may be configured to determine that the crosswind blows from the left to the right.

As an example, the platooning control apparatus 100 may further include a steering angle sensor (not shown) for obtaining a steering angle of the vehicle.

As an example, the steering angle sensor (not shown) may be configured to sense information about an angle at which the steering wheel is manipulated.

As an example, the processor 120 may be configured to determine at least one of whether a crosswind occurs or a direction of the crosswind, with regard to the steering angle.

Because compensation steering by the crosswind is able to be performed, the processor 120 may be configured to determine that the crosswind blows from the left to the right when the steering angle is an angle steered in a right direction, and may be further configured to determine that the crosswind blows from the right to the left when the steering angle is an angle steered in a left direction.

Figure 2:
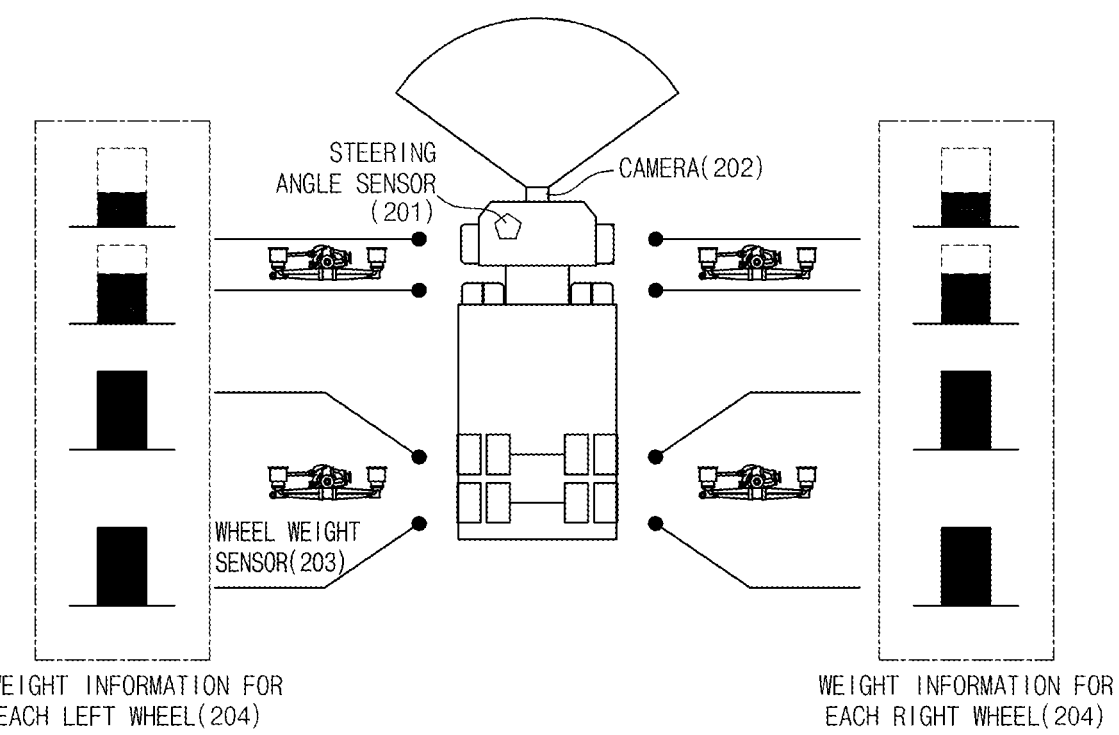
FIG. 2 is a drawing illustrating a detailed configuration of a platooning control apparatus according to an embodiment of the present disclosure.

FIG. 2 is a drawing illustrating a detailed configuration of a platooning control apparatus (e.g., the platooning control apparatus 100 of FIG. 1) according to an embodiment of the present disclosure.

Referring to FIG. 2, the platooning control apparatus may include a steering angle sensor 201, a camera 202, and a wheel weight sensor 203.

As an example, the steering angle sensor 201 may be configured to sense an angle at which the steering wheel is manipulated.

The steering angle may be used in a process where an embodiment of the present disclosure determines whether a crosswind blows or a direction of the crosswind.

As an example, the camera 202 may be provided in a host vehicle and configured to obtain an image in front of the host vehicle.

The obtained image in front of the host vehicle may be used in a process where an embodiment of the present disclosure identifies information about positions of lines where the vehicle is traveling.

As an example, the wheel weight sensor 203 may sense a weight applied to a wheel, for each wheel.

As an example, the wheel weight sensor 203 may sense air suspension pressure of each wheel of the host vehicle to sense a weight corresponding to the air suspension pressure.

Furthermore, the wheel weight sensor 203 may be configured to sense weight information 204 for each left wheel of the vehicle and weight information 205 for each right wheel of the vehicle.

As an example, the wheel weight sensor 203 may be configured to output the sensed weight of each wheel through a cluster of the host vehicle.

As an example, the wheel weight sensor 203 may be configured to sense all of pieces of weight information of wheels of a tractor part and a trailer part of the host vehicle. However, only information about a weight applied to the wheels connected with the trailer part may be used in an embodiment of the present disclosure.

As an example, information about a value obtained by adding weights of left wheels among the wheels connected with the trailer part and a value obtained by adding weights of right wheels among the wheels connected with the trailer part may be used.

As an example, the steering angle sensor 201, the camera 202, and the wheel weight sensor 203 may be configured to deliver the obtained information to the processor 120 of FIG. 1.

Figure 3:
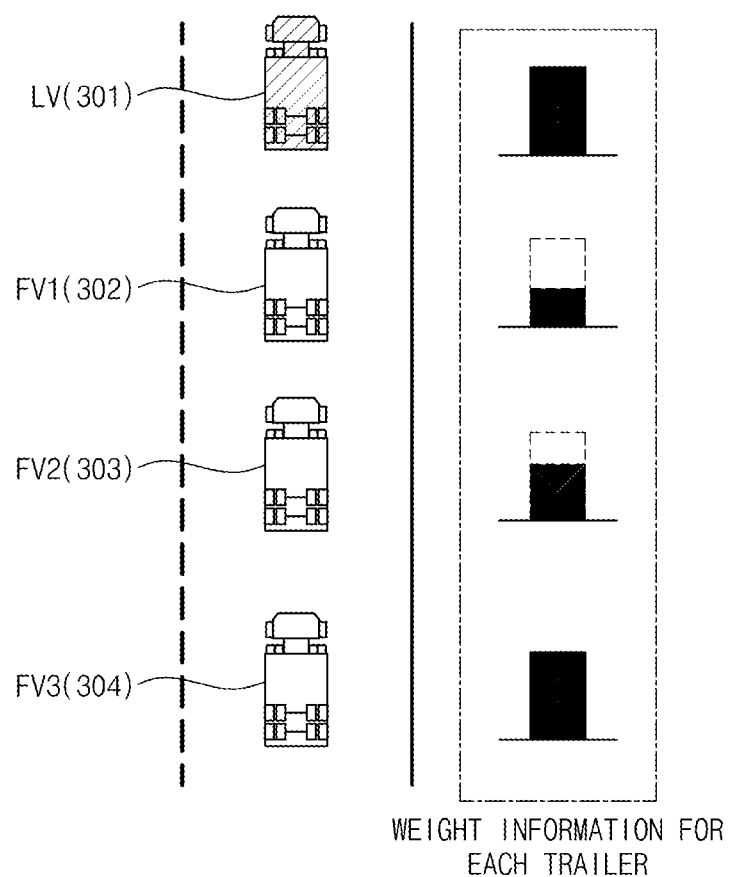
FIG. 3 is a drawing illustrating that platooning vehicles platoon in a general situation where there is no crosswind according to an embodiment of the present disclosure.

FIG. 3 is a drawing illustrating that platooning vehicles platoon in a general situation where there is no crosswind according to an embodiment of the present disclosure.

Referring to FIG. 3, a string of vehicles may include a leading vehicle (LV) 301 which located at the forefront and one or more following vehicles (FVs) 302 to 304 which follow the LV 301.

Herein, a gap between a plurality of the vehicles of the string may be maintained.

As an example, the LV 301 may maintain a gap between the plurality of vehicles included in the string and may be configured to exchange information about behaviors and situations of the plurality of vehicles included in the string using inter-vehicle communication. A gap between vehicles included in a platooning group may be adjusted during driving.

In a general situation where there is no crosswind, the string may be arranged and formed irrespective of an order of weights of trailers of the respective vehicles.

Thus, the platooning control apparatus 100 of FIG. 1 may be configured to identify a risk that the vehicles making up the string may overturn due to a crosswind.

As an example, to identify the risk that the vehicles making up the string overturn due to the crosswind, the platooning control apparatus 100 may be configured to perform V2X or vehicle to vehicle (V2V) communication with another vehicle or may communicate with a server to obtain information about a weight of a trailer of the other vehicle.

Furthermore, the platooning control apparatus 100 may be configured to determine a weight of a trailer of a host vehicle based upon an air suspension pressure sensor provided in the host vehicle.

Figure 4:
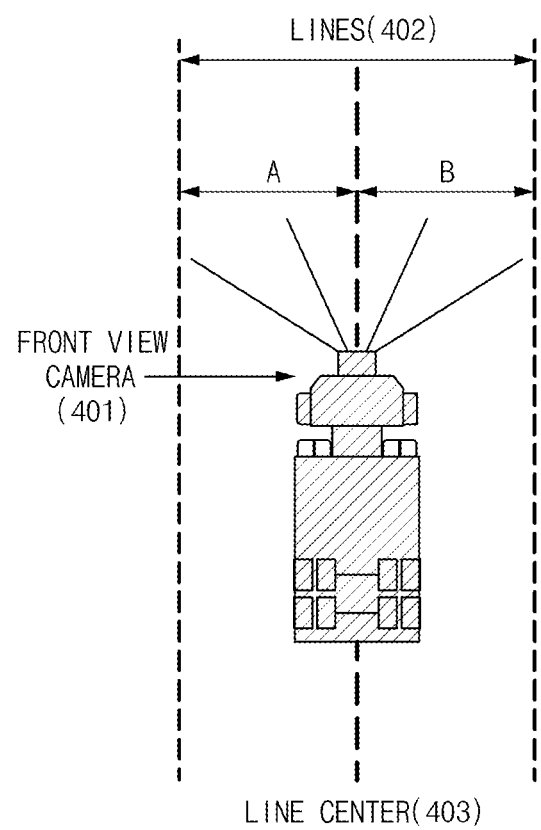
FIG. 4 is a drawing illustrating that a platooning control apparatus recognizes lines according to an embodiment of the present disclosure.

FIG. 4 is a drawing illustrating that a platooning control apparatus recognizes lines according to an embodiment of the present disclosure.

Referring to FIG. 4, the platooning control apparatus 100 of FIG. 1 may be configured to obtain an image in front of a host vehicle using a front view camera 401.

The platooning control apparatus 100 may be configured to detect left and right lines of a road where the host vehicle is traveling, based upon the obtained image in front of the host vehicle.

The platooning control apparatus 100 may be configured to calculate a center 403 of the detected left and right lines.

The platooning control apparatus 100 may be configured to calculate a distance A from the center 403 of the lines to the left line and a distance B from the center 403 of the lines to the right line.

The platooning control apparatus 100 may be configured to compare the distance A from the center 403 of the lines to the left line with the distance B from the center 403 of the lines to the right line to determine a line keeping state of the vehicle.

As an example, when it is determined (e.g., by the processor 120 of the platooning control apparatus 100) that the distance A from the center 403 of the lines to the left line and the distance B from the center 403 of the lines to the right line are the same as each other, the platooning control apparatus 100 may be configured to determine that the line keeping state is good.

As an example, when it is determined (e.g., by the processor 120 of the platooning control apparatus 100) that the distance A from the center 403 of the lines to the left line and the distance B from the center 403 of the lines to the right line are not the same as each other, the platooning control apparatus 100 may determine that the line keeping state is not good.

As an example, the platooning control apparatus 100 may be configured to determine whether the distance A from the center 403 of the lines to the left line and the distance B from the center 403 of the lines to the right line are the same as each other, based on whether a difference between the distance A from the center 403 of the lines to the left line and the distance B from the center 403 of the lines to the right line is less than a threshold.

Furthermore, the platooning control apparatus 100 may be configured to determine whether the vehicle is going straight, based on whether it is determined that the distance A from the center 403 of the lines to the left line and the distance B from the center 403 of the lines to the right line are the same as each other.

As an example, when the distance A from the center 403 of the lines to the left line and the distance B from the center 403 of the lines to the right line remain the same, the platooning control apparatus 100 may be configured to determine that the vehicle is going straight.

As an example, when the distance A from the center 403 of the lines to the left line and the distance B from the center 403 of the lines to the right line does not remain the same, the platooning control apparatus 100 may be configured to determine that the vehicle is not going straight.

Figure 5:
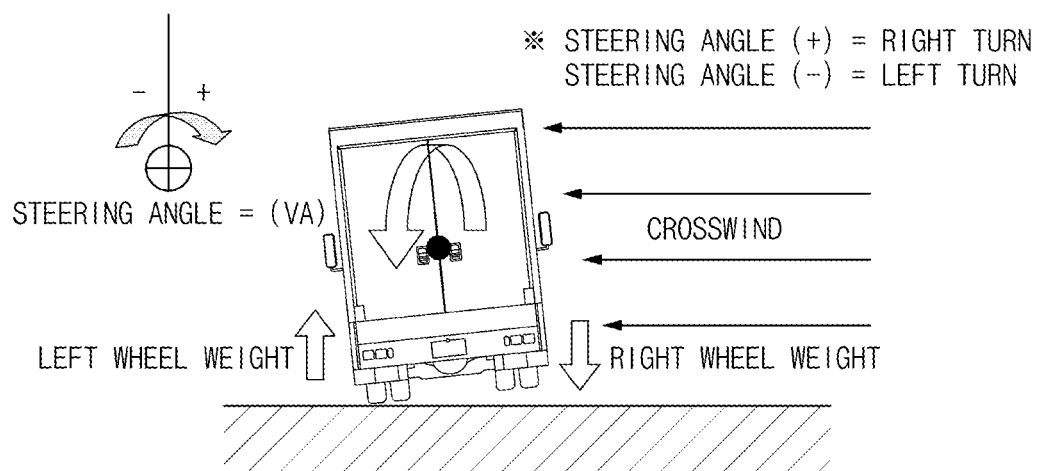
FIG. 5 is a drawing illustrating that a platooning control apparatus recognizes a crosswind and a direction of the crosswind according to an embodiment of the present disclosure.

FIG. 5 is a drawing illustrating that a platooning control apparatus configured to recognize a crosswind and a direction of the crosswind according to an embodiment of the present disclosure.

FIG. 5 is a drawing illustrating a situation where the crosswind blows from the right of a vehicle to the left of the vehicle.

As an example, when the crosswind blows from the right of the vehicle to the left of the vehicle, a torque in the direction of roll may occur with respect to the center of the vehicle.

At this time, a weight applied to left wheels of the vehicle may increase and a weight applied to right wheels may decrease.

When the crosswind blows from the right of the vehicle to the left of the vehicle, to compensate for a phenomenon where the vehicle leans due to the crosswind, steering control may be performed to the right by an autonomous driving system of the host vehicle.

At this time, the steering angle may be a direction (e.g., a +direction) where the vehicle is steered to the right.

In other words, in a state where the road is recognized as being flat, and where the vehicle is going straight, the platooning control apparatus 100 of FIG. 1 may be configured to compare a weight applied to left wheels with a weigh applied to right wheels and to compare a steering angle with "0" in order to determine whether a crosswind occurs or a direction of the crosswind.

The description is given of when the crosswind blows from the right of the host vehicle to the left of the host vehicle in the example of FIG. 5. However, when the crosswind blows from the left of the host vehicle to the right of the host vehicle, the platooning control apparatus 100 may be configured to compare a weight applied to left wheels with a weigh applied to right wheels and to compare a steering angle with "0" to determine whether a crosswind occurs or a direction of the crosswind, in a state where the road is recognized as being flat and where the vehicle is going straight, in a similar manner.

Figure 6:
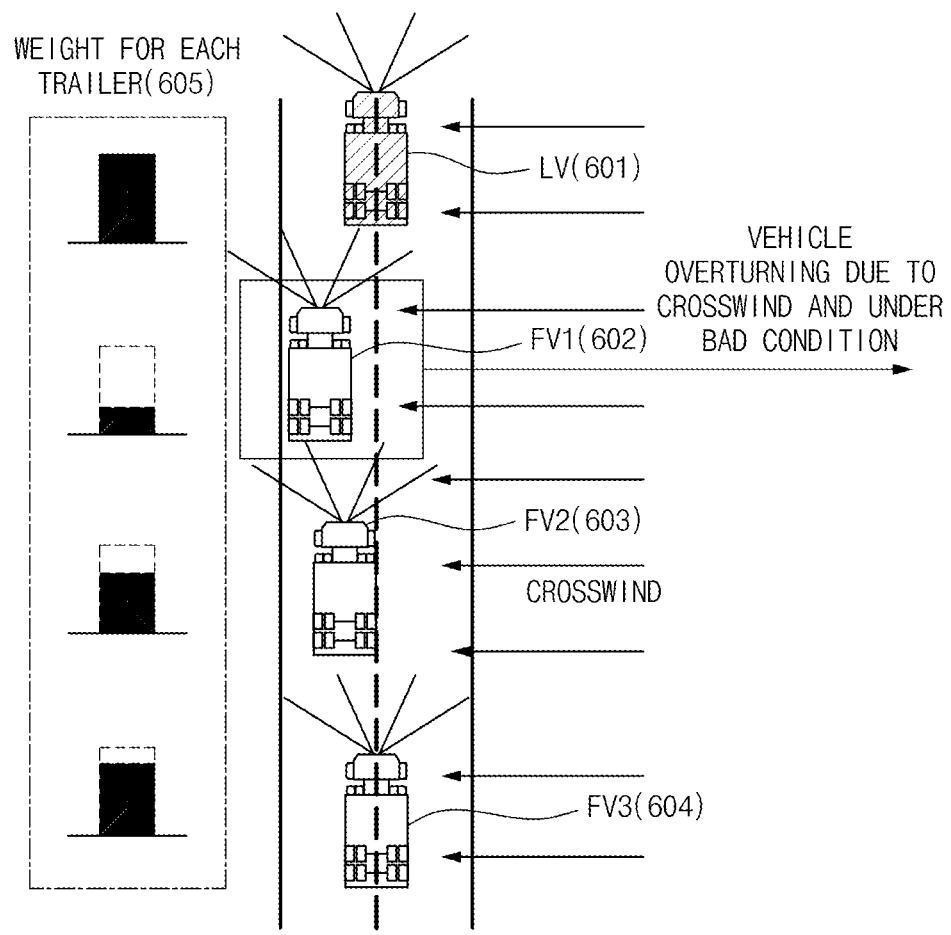
FIG. 6 is a drawing illustrating that a platooning control apparatus determines a vehicle with the highest risk of rollover among vehicles in a string according to an embodiment of the present disclosure.

FIG. 6 is a drawing illustrating that a platooning control apparatus determines a vehicle with the highest risk of rollover among vehicles in a string according to an embodiment of the present disclosure.

Referring to a weight 605 for each trailer in FIG. 6, weights of the trailers respectively included in vehicles may decrease in an order of LV 601, FV3 604, FV2 603, and FV1 602.

Because the larger the weight of the trailer of a vehicle, the larger the rotational inertia in the direction of roll of a vehicle, a risk of rollover of a vehicle having a trailer with a large weight may decrease.

On the other hand, because the smaller the weight of the trailer of a vehicle, the smaller the rotational inertia in the direction of roll of a vehicle, a risk of rollover of a vehicle having a trailer with a small weight may increase.

Thus, the platooning control apparatus 100 of FIG. 1 may be configured to determine a risk of each of vehicles in a string depending on weights of the trailers of the vehicles in the string.

The platooning control apparatus 100 may be configured to determine that FV 602 has a trailer with the smallest weight among the vehicles in the string and, therefore, has the highest risk of rollover.

The platooning control apparatus 100 may be configured to perform formation control for preventing FV1 602 with the highest risk of rollover from rollover.

Figure 7:
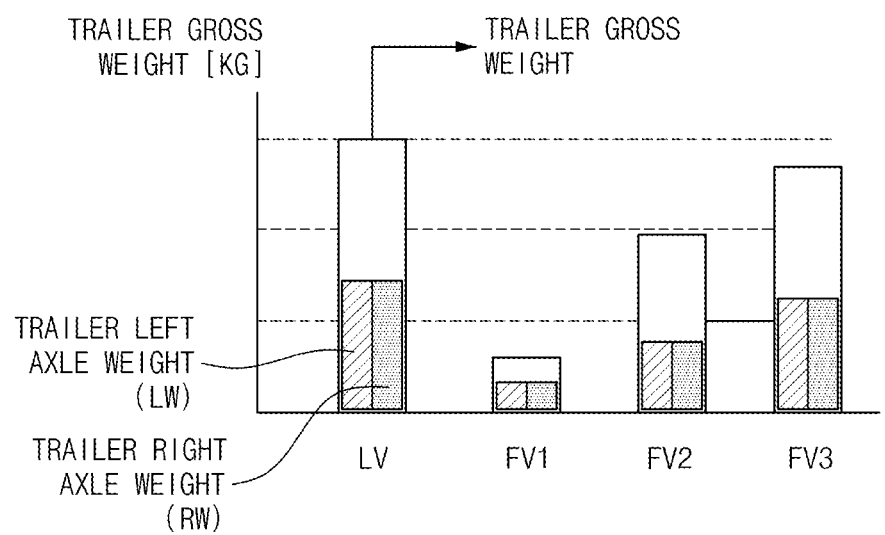
FIG. 7 is a drawing illustrating that a platooning control apparatus determines a risk of rollover based on a weight of a trailer part according to an embodiment of the present disclosure.

FIG. 7 is a drawing illustrating that a platooning control apparatus determines a risk of rollover based on a weight of a trailer part according to an embodiment of the present disclosure.

Referring to FIG. 7, the platooning control apparatus 100 of FIG. 1 may be configured to obtain information about a trailer left axle weight LW, a trailer right axle weight RW, and a trailer gross weight of each of the vehicles in the string.

As an example, the platooning control apparatus 100 may be configured to detect a weight applied to each wheel of a trailer part of a host vehicle in the string, using a wheel weight sensor.

As an example, the platooning control apparatus 100 may be configured to calculate a trailer left axle weight LW, a trailer right axle weight RW, and a trailer gross weight of the host vehicle in the string, based on the weight applied to each wheel of the host vehicle. This weight may be obtained using the wheel weight sensor.

As an example, the platooning control apparatus 100 may be configured to add weights applied to left wheels of the trailer part of the host vehicle to calculate the trailer left axle weight LW of the host vehicle.

As an example, the platooning control apparatus 100 may be configured to add weights applied to right wheels of the trailer part of the host vehicle to calculate the trailer right axle weight RW of the host vehicle.

As an example, the platooning control apparatus 100 may be configured to add the trailer left axle weight LW of the host vehicle and the trailer right axle weight RW of the host vehicle to calculate the trailer gross weight of the host vehicle.

As an example, the platooning control apparatus 100 may be configured to obtain information about a trailer left axle weight LW, a trailer right axle weight RW, and a trailer gross weight of another vehicle in the string, using V2X or V2V communication.

Figure 8:
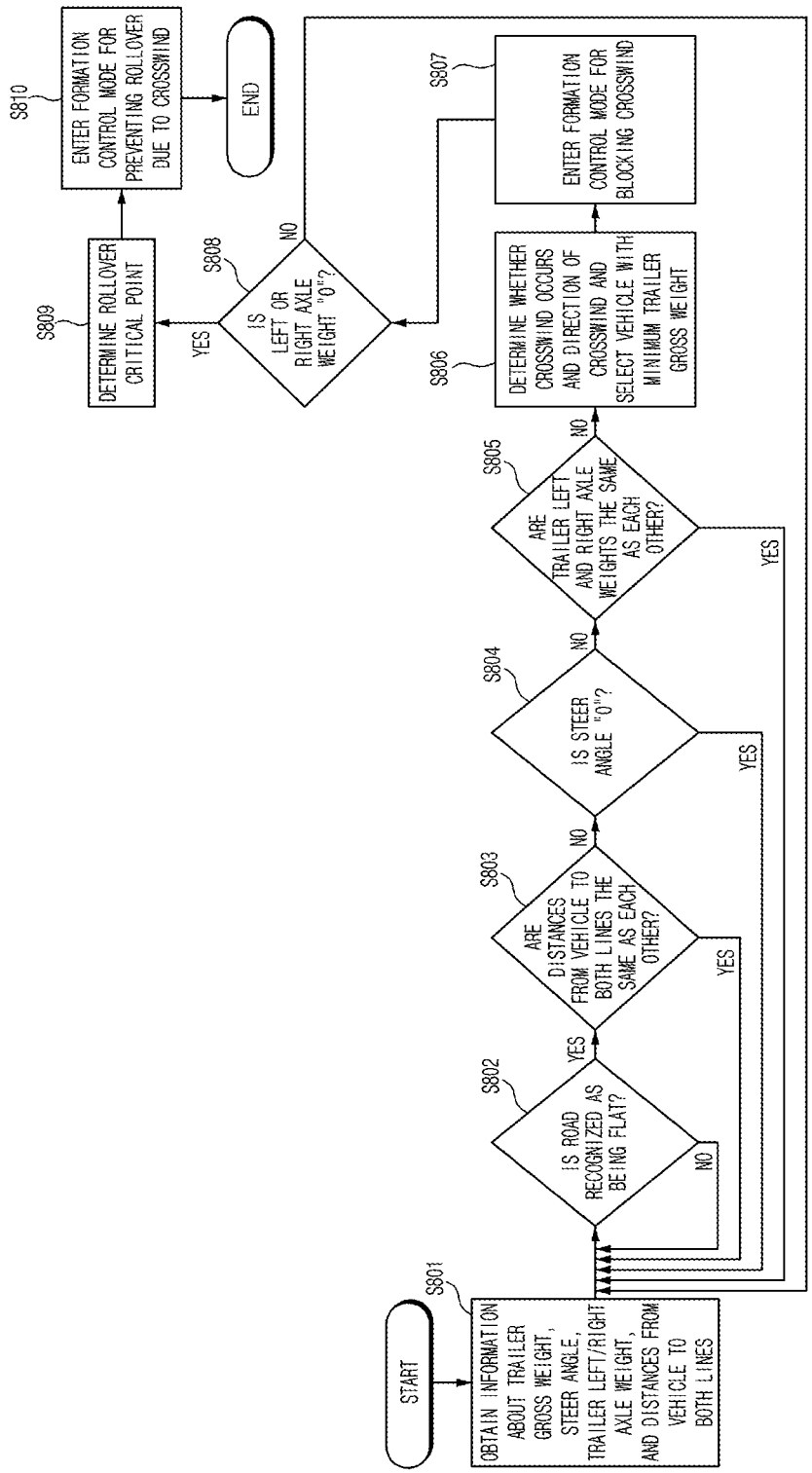
FIG. 8 is a flowchart illustrating an operation of a platooning control apparatus according to an embodiment of the present disclosure.

FIG. 8 is a flowchart illustrating an operation of a platooning control apparatus according to an embodiment of the present disclosure.

Referring to FIG. 8, in S801, a platooning control apparatus 100 of FIG. 1 may obtain information about a trailer gross weight, a steer angle, a trailer left/right axle weight, and distances from a vehicle to both lines.

As an example, the platooning control apparatus 100 may determine a trailer gross weight and a trailer left/right axle weight based upon a weight applied to each wheel of a trailer of a host vehicle. This weight may be obtained using a wheel weight sensor.

As an example, the platooning control apparatus 100 may obtain information about a steer angle of the host vehicle using a steering angle sensor.

As an example, the platooning control apparatus 100 may determine distances from the host vehicle to both lines, based on an image around the host vehicle. This image may be obtained using a camera provided in the host vehicle.

As an example, the platooning control apparatus 100 may obtain information about a trailer gross weight and a trailer left/right axle weight of another vehicle in the string, using V2X or V2V communication.

After obtaining the information about the trailer gross weight, the steer angle, the trailer left/right axle weight, and the distances from the vehicle to both lines in S801, in S802, the platooning control apparatus 100 may identify whether the road where the vehicle is traveling is recognized as being flat.

As an example, the platooning control apparatus 100 may determine whether the road where the vehicle is traveling is flat based upon navigation map information or a sensor provided in the vehicle.

After identifying whether the road upon which the vehicle is traveling is flat in S802, when the road where the vehicle is traveling is not recognized as being flat, the platooning control apparatus 100 may return to S802 to identify whether the road where the vehicle is traveling is flat.

After identifying whether the road where the vehicle is traveling is flat in S802, when the road where the vehicle is traveling is recognized as being flat, in S803, the platooning control apparatus 100 may identify whether distances from the center of the vehicle to both lines of the lane where the vehicle is traveling are the same as each other.

As an example, the platooning control apparatus 100 may identify whether distances from the center of the vehicle to both lines of the lane where the vehicle is traveling are the same as each other based upon an image in front of the vehicle. This image may be obtained using a camera.

As an example, when the distances from the center of the vehicle to both the lines of the lane where the vehicle is traveling are the same as each other, the platooning control apparatus 100 may determine that the vehicle is going straight and that lane keeping is good.

After identifying whether the distances from the center of the vehicle to both the lines of the lane where the vehicle is traveling are the same as each other in S803, when it is identified that the distances from the center of the vehicle to both the lines of the lane where the vehicle is traveling are not the same as each other, the platooning control apparatus 100 may return to S802 to identify whether the road where the vehicle is traveling is recognized as being flat.

After identifying whether the distances from the center of the vehicle to both the lines of the lane where the vehicle is traveling are the same as each other in S803, when it is identified that the distances from the center of the vehicle to both the lines of the lane where the vehicle is traveling are the same as each other, in S804, the platooning control apparatus 100 may identify whether the steer angle is "0".

As an example, when the steer angle is not "0", the platooning control apparatus 100 may determine that steering control of the vehicle is performed to the left or the right.

As an example, when the steer angle is "0", the platooning control apparatus 100 may determine that a crosswind does not occur.

After identifying whether the steer angle is "0" in S804, when it is identified that the steering angle is "0", the platooning control apparatus 100 may return to S802 to identify whether the road where the vehicle is traveling is recognized as being flat.

After identifying whether the steer angle is "0" in S804, when it is identified that the steering angle is not "0", in S805, the platooning control apparatus 100 may be configured to identify whether the trailer left axle weight and the trailer right axle weight are the same as each other.

As an example, when the trailer left axle weight and the trailer right axle weight are the same as each other, the platooning control apparatus 100 may be configured to determine that a crosswind does not occur.

S802 to S806 may be performed at the same time or may be performed in a changed order, according to an embodiment.

After identifying whether the trailer left axle weight and the trailer right axle weight are the same as each other in S805, when the trailer left axle weight and the trailer right axle weight are the same as each other, the platooning control apparatus 100 may return to S802 to identify whether the road where the vehicle is traveling is recognized as being flat.

After identifying whether the trailer left axle weight and the trailer right axle weight are the same as each other in S805, when the trailer left axle weight and the trailer right axle weight are not the same as each other, in S806, the platooning control apparatus 100 may determine whether a crosswind occurs and a direction of the crosswind and may select a vehicle with a minimum trailer gross weight among vehicles in the string.

As an example, when the steering angle is not "0" and when the trailer left axle weight and the trailer right axle weight are not the same as each other, the platooning control apparatus 100 may determine that a crosswind occurs.

As an example, when the steering angle is greater than "0" (when the vehicle is steered to the right) and when the trailer left axle weight is greater than the trailer right axle weight, the platooning control apparatus 100 may determine that the crosswind blows from the right of the vehicle to the left of the vehicle.

As an example, when the steering angle is less than "0" (when the vehicle is steered to the left) and when the trailer right axle weight is greater than the trailer left axle weight, the platooning control apparatus 100 may determine that the crosswind blows from the left of the vehicle to the right of the vehicle.

As an example, the platooning control apparatus 100 may select the vehicle with the minimum trailer gross weight among the vehicles in the string based upon the trailer gross weight of the vehicles included in the string, which is obtained in S801.

When it is identified that the trailer left axle weight and the trailer right axle weight are not the same as each other, in S806, the platooning control apparatus 100 may determine whether a crosswind occurs and a direction of the crosswind and may select the vehicle with the minimum trailer gross weight among the vehicles in the string. In S807, the platooning control apparatus 100 may enter a formation control mode for blocking the crosswind.

As an example, the platooning control apparatus 100 may change the string such that a vehicle with the largest trailer gross weight among the vehicles included in the string is located in a direction where the crosswind blows, with respect to the vehicle with the minimum trailer gross weight among the vehicles in the string.

As an example, when the host vehicle is the vehicle with the largest trailer gross weight among the vehicles included in the string, the platooning control apparatus 100 may control platooning of the host vehicle such that the host vehicle is located in a direction where the crosswind blows, with respect to the vehicle with the minimum trailer gross weight among the vehicles in the string.

After entering the formation control mode for blocking the crosswind in S807, in S808, the platooning control apparatus 100 may identify whether the trailer left axle weight or the trailer right axle weight is "0".

As an example, the platooning control apparatus 100 may identify whether there is a vehicle, the trailer left axle weight or the trailer right axle weight of which is "0", among the vehicles included in the string.

After identifying whether the trailer left axle weight or the trailer right axle weight is "0", when it is identified that the trailer left axle weight or the trailer right axle weight is not "0", the platooning control apparatus 100 may return to S802 to identify whether the road where the vehicle is traveling is recognized as being flat.

After identifying whether the trailer left axle weight or the trailer right axle weight is "0", when it is identified that the trailer left axle weight or the trailer right axle weight is "0", in S809, the platooning control apparatus 100 may determine that the vehicle identified that the trailer left axle weight or the trailer right axle weight is "0" reaches a rollover critical point.

After determining that the vehicle identified that the trailer left axle weight or the trailer right axle weight is "0" reaches the rollover critical point in S809, in S810, the platooning control apparatus 100 may enter a formation control mode for preventing rollover due to the crosswind.

As an example, the platooning control apparatus 100 may change the string such that a vehicle with the second largest trailer gross weight is located close to a direction where the vehicle which reaches the rollover critical point overturns due to the crosswind among the vehicles included in the string, with respect to the vehicle which reaches the rollover critical point among the vehicles included in the string.

As an example, when the host vehicle is the vehicle with the second largest trailer gross weight among the vehicles included in the string, the platooning control apparatus 100 may control platooning of the host vehicle such that the host vehicle is located in a direction where the vehicle which reaches the rollover critical point overturns due to the crosswind, with respect to the vehicle which reaches the rollover critical point among the vehicles in the string.

Figure 9:
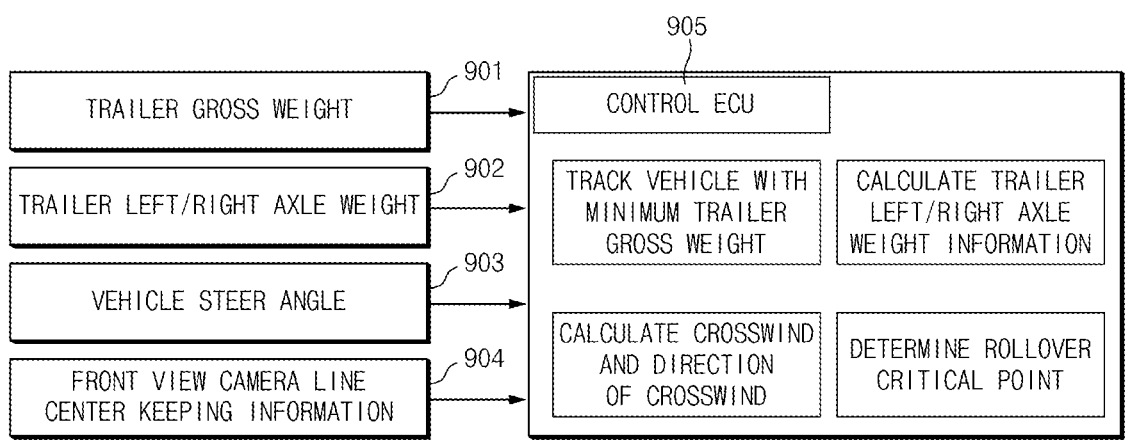
FIG. 9 is a drawing illustrating a detailed configuration of a platooning control apparatus according to another embodiment of the present disclosure.

FIG. 9 is a drawing illustrating a detailed configuration of a platooning control apparatus according to another embodiment of the present disclosure.

Referring to FIG. 9, a processor 120 of FIG. 1 may include a control ECU 905 of a vehicle.

The control ECU 905 of the vehicle may obtain information 901 about a trailer gross weight, information 902 about a trailer left/right axle weight, information 903 about a vehicle steer angle, and line center keeping information 904 by means of an image of a front view camera.

As an example, the control ECU 905 of the vehicle may be configured to obtain information about a trailer gross weight of each of a host vehicle and other vehicles included in a string, information about a trailer left axle weight of each of the host vehicle and the other vehicles included in the string, and information about a trailer right axle weight of each of the host vehicle and the other vehicles included in the string.

As an example, the control ECU 905 of the vehicle may be configured to obtain the information 903 of a steer angle of the host vehicle included in the string.

As an example, the control ECU 905 of the vehicle may be configured to detect both lines of a lane where vehicles are platooning, by means of an image obtained using a front view camera of the host vehicle included in the string. As an example, the control ECU 905 of the vehicle may be configured to calculate a center of both the lines based on both the detected lines and may determine whether the host vehicle keeps the center of both the lines and is platooning.

As an example, the control ECU 905 of the vehicle may track a vehicle with a minimum trailer gross weight among the host vehicle and the other vehicles included in the string.

As an example, the control ECU 905 of the vehicle may be configured to calculate a weight applied to each wheel by means of air suspension pressure corresponding to each wheel of a trailer of the host vehicle.

As an example, the control ECU 905 of the vehicle may be configured to calculate information about a trailer left/right weight of the host vehicle based on the weight applied to each wheel of the trailer of the host vehicle.

As an example, the control ECU 905 of the vehicle may be configured to determine whether a crosswind occurs and may calculate a direction of the crosswind, based on a difference between the trailer left axle weight and the trailer right axle weight of the host vehicle and a steer angle of the host vehicle.

As an example, the control ECU 905 of the vehicle may be configured to determine whether there is a vehicle which reaches a rollover critical point among the host vehicle and the other vehicles included in the string.

Figure 10:
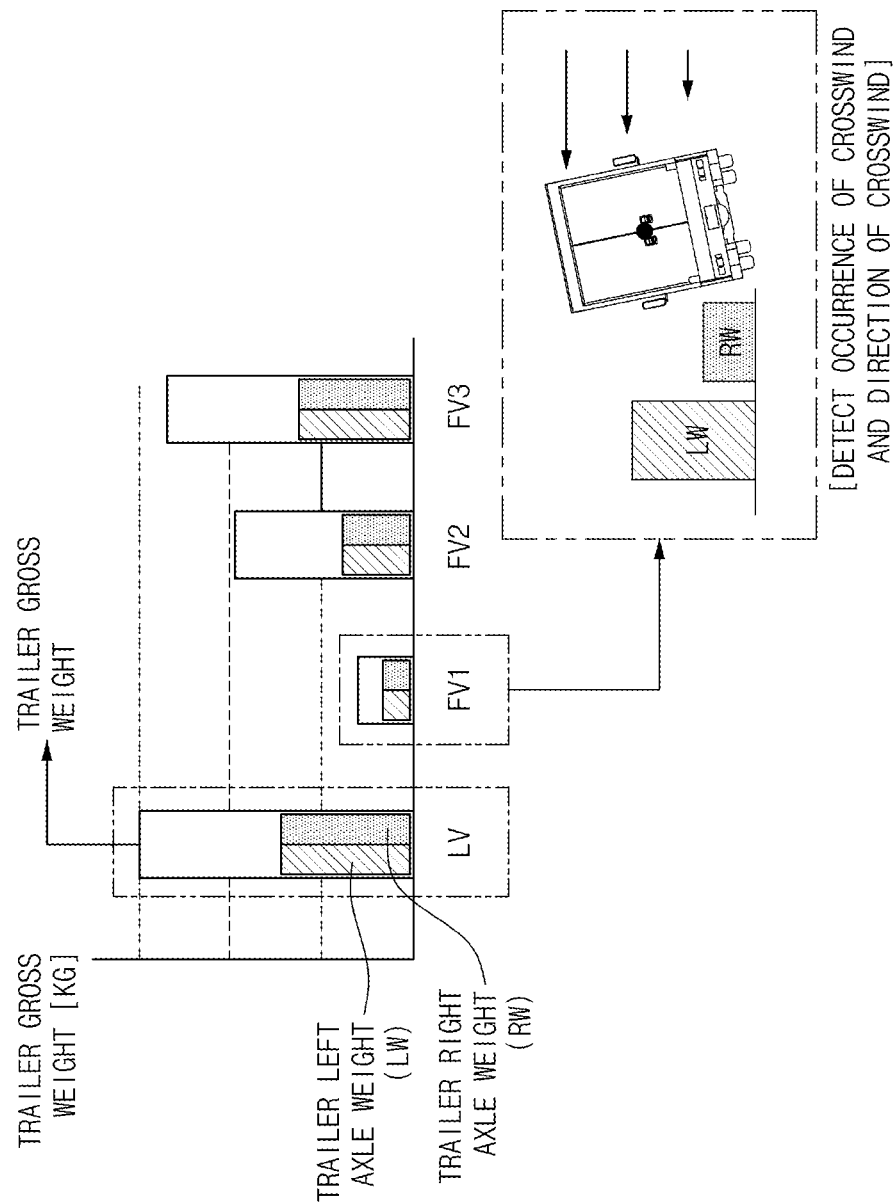
FIG. 10 is a drawing illustrating that a platooning control apparatus determines a vehicle with the highest risk of rollover and a vehicle with the lowest risk of rollover according to an embodiment of the present disclosure.

FIG. 10 is a drawing illustrating a platooning control apparatus be configured to determine a vehicle with the highest risk of rollover and a vehicle with the lowest risk of rollover according to an embodiment of the present disclosure.

Referring to FIG. 10, a weight of a trailer of LV among vehicles included in a string may be largest. Furthermore, a weight of a trailer of FV1 among the vehicles included in the string may be smallest.

A trailer left axle weight of FV1 may be greater than a trailer right axle weight of FV1.

At this time, a platooning control apparatus 100 of FIG. 1 may be configured to determine that a crosswind occurs from the right of the vehicle to the left of the vehicle.

Comparing the trailer left axle weight of FV1 with the trailer right axle weight of FV1 is described as an example. However, the platooning control apparatus 100 may be configured to compare a trailer left axle weight of LV, FV2, or FV3 rather than FV1 with a trailer right axle weight of LV, FV2, or FV3 to determine whether a crosswind occurs and a direction of the crosswind.

The platooning control apparatus 100 may be configured to determine FV1 with the smallest trailer weight among the vehicles included in the string as a vehicle with the highest risk of rollover among the vehicles included in the string.

As an example, the platooning control apparatus 100 may be configured to determine LV with the largest trailer weight among the vehicles included in the string as a vehicle with the lowest risk of rollover among the vehicles in the string.

As an example, the platooning control apparatus 100 may perform formation control configured to change the string such that LV with the largest trailer weight among the vehicles included in the string is located in a direction where the crosswind blows, with respect to FV1 with the smallest trailer weight among the vehicles in the string.

Figure 11:
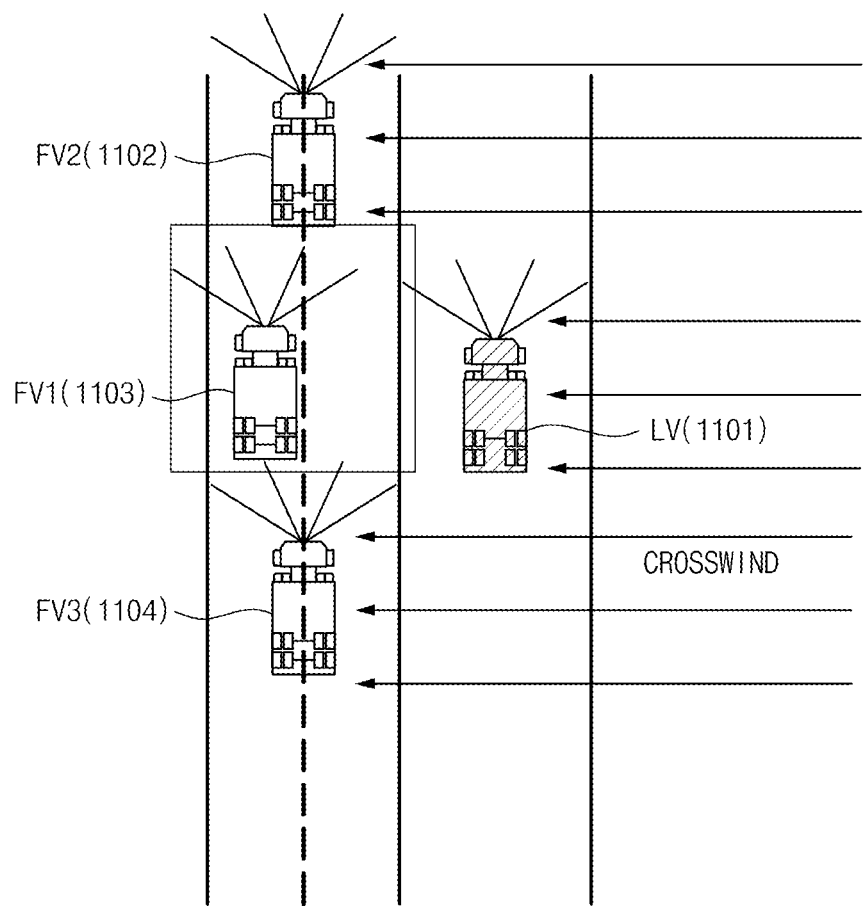
FIG. 11 is a drawing illustrating that a platooning control apparatus performs formation control for blocking a crosswind according to an embodiment of the present disclosure.

FIG. 11 is a drawing illustrating that a platooning control apparatus performs formation control configured to block a crosswind according to an embodiment of the present disclosure.

Referring to FIG. 11, a platooning control apparatus 100 of FIG. 1 may perform formation control configured to change a string such that LV 1101 with the largest trailer weight among vehicles included in the string is located in a direction where a crosswind blows, with respect to FV1 1103 with the smallest trailer weight among the vehicles in the string.

As an example, LV 1101 may change a lane in a direction where the crosswind blows with respect to a lane where existing platooning is performed and may platoon at a side of FV1 1103.

Furthermore, FV2 1102 and FV3 1104, where the trailer weight is not smallest and is not largest among the vehicles included in the string, may travel on the existing platooning lane and may maintain a gap with front and rear vehicles.

Thus, LV 1101 with the lowest risk of rollover among the vehicles included in the string may prevent a crosswind applied to FV1 1103 with the highest risk of rollover among the vehicles included in the string.

Figure 12:
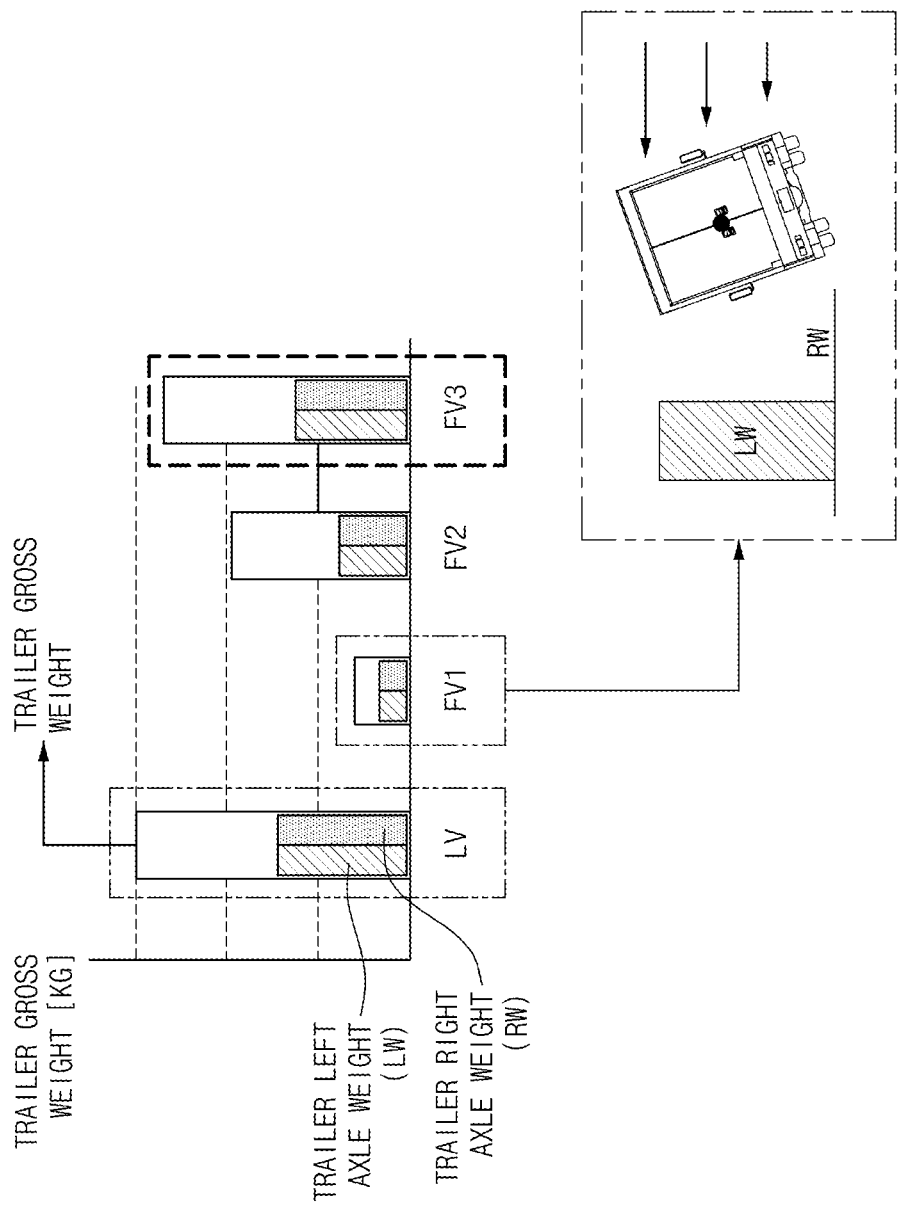
FIG. 12 is a drawing illustrating that a platooning control apparatus determines a vehicle which reaches a rollover critical point and a vehicle with the second lowest risk of rollover according to an embodiment of the present disclosure.

FIG. 12 is a drawing illustrating that a platooning control apparatus may be configured to determine a vehicle which reaches a rollover critical point and a vehicle with the second lowest risk of rollover according to an embodiment of the present disclosure.

Referring to FIG. 12, a trailer right axle weight (a gross weight applied to right wheels of a trailer) of FV1 among vehicles included in a string may be "0".

At this time, a platooning control apparatus 100 of FIG. 1 may be configured to determine that FV1 reaches a rollover critical point.

FV3 among the vehicles included in the string may have the second largest trailer weight.

The platooning control apparatus 100 may be configured to determine FV3 with the second largest trailer weight among the vehicles included in the string as a vehicle with the second lowest risk of rollover among the vehicles in the string.

The platooning control apparatus 100 may be configured to perform formation control for changing the string such that FV3 with the second largest trailer weight among the vehicles included in the string is located in a direction where FV1 overturns due to the crosswind, with respect to FV1 which reaches the rollover critical point among the vehicles in the string.

Figure 13:
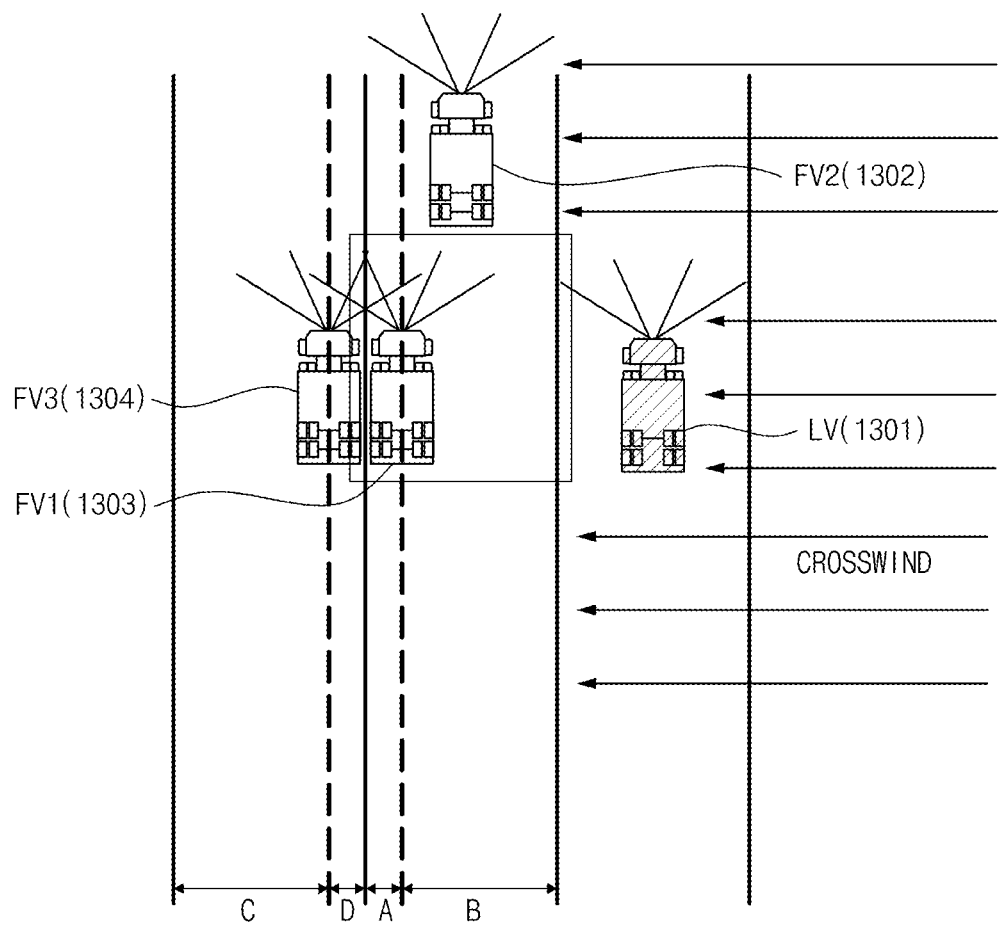
FIG. 13 is a drawing illustrating that a platooning control apparatus performs formation control for blocking rollover according to an embodiment of the present disclosure.

FIG. 13 is a drawing illustrating that a platooning control apparatus performs formation control configured to block rollover according to an embodiment of the present disclosure.

Referring to FIG. 13, the platooning control apparatus 100 of FIG. 1 may perform formation control configured to change a string such that FV3 1304 with the second largest trailer weight among vehicles included in the string is located in a direction where FV1 1303 which reaches a rollover critical point overturns due to a crosswind, with respect to FV1 1303 which reaches the rollover critical point among the vehicles in the string.

As an example, FV3 1304 may change a lane in a direction where FV3 1304 overturns due to the crosswind with respect to a lane where existing platooning is performed and may be close to FV1 1303 at a side of FV1 1303 to platoon.

The platooning control apparatus 100 may be configured to perform formation control to maintain a range determined that a distance D to a line adjacent in the direction of FV1 1303 with respect to FV3 1034 is the same as a distance A to a line adjacent in the direction of FV3 1304 with respect to FV1 1033 and that the speed of FV3 1034 is the same as the speed of FV1 1303.

Furthermore, LV 1301 with the largest trailer weight among the vehicles included in the string may be located in a direction where the crosswind blows to platoon, with respect to FV1 1033 with the smallest trailer weight among the vehicles included in the string.

Furthermore, FV2, the trailer weight of which is not smallest, is not largest, and is not the second largest among the vehicles included in the string, which does not reaches a rollover critical point, may travel on an existing platooning lane and may maintain a gap with front and rear vehicles.

Thus, when FV1 1303 which reaches the rollover critical point to be faced with rollover among the vehicles included in the string is about to overturn, FV3 1304 may support FV1 1303 in a direction where FV1 1303 overturns.

Figure 14:
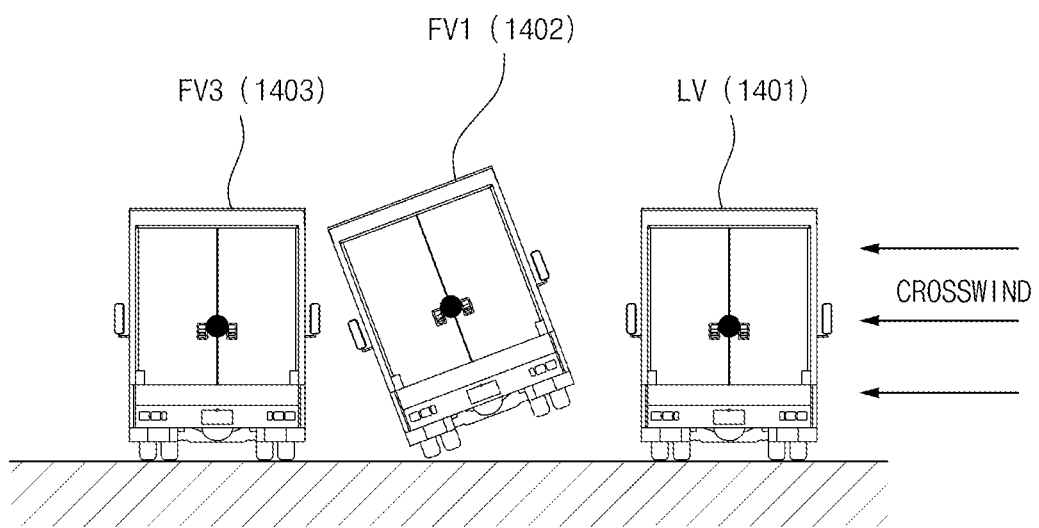
FIG. 14 is a drawing illustrating in detail that a platooning control apparatus performs formation control for blocking rollover according to an embodiment of the present disclosure.

FIG. 14 is a drawing illustrating in detail that a platooning control apparatus performs formation control configured to block rollover according to an embodiment of the present disclosure.

FIG. 14 is a drawing illustrating performance of formation control for blocking rollover of FV1 1042 with the smallest trailer weight, which reaches a rollover critical point, among vehicles included in a string, which is viewed from behind vehicles.

LV 1401 may be located in a direction where a crosswind blows with respect to FV1 1402 to block the crosswind.

Furthermore, FV3 1403 may be located close to a direction where FV1 1042 overturns due to the crosswind with respect to FV1 1402 to support FV1 1042 when FV1 1042 is about to overturn.

A situation where FV1 1402 overturns due to the crosswind may be prevented by formation control for blocking LV 1401 and FV3 1403 from rollover to ensure stability of platooning of an autonomous truck.

Figure 15:
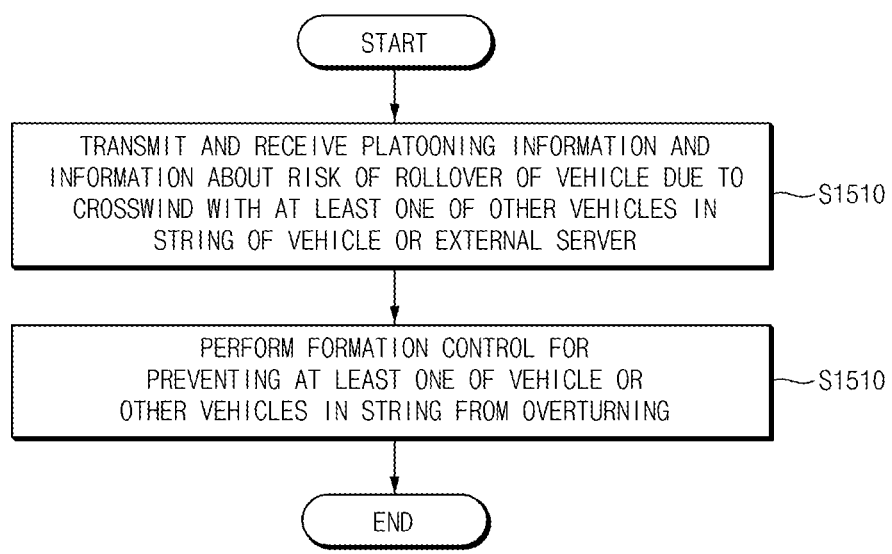
FIG. 15 is a flowchart illustrating a platooning control method according to an embodiment of the present disclosure.

FIG. 15 is a flowchart illustrating a platooning control method according to an embodiment of the present disclosure.

Referring to FIG. 15, the platooning control method may include transmitting and receiving (S1510) platooning information and information about a risk of rollover of a vehicle due to a crosswind with at least one of other vehicles in a string of the vehicle or an external server and performing (S1520) formation control for preventing at least one of the vehicle or the other vehicles in the string from rollover.

The transmitting and receiving (S1510) of the platooning information and the information about the risk of rollover of the vehicle due to the crosswind with the at least one of the other vehicles in the string of the vehicle or the external server may be performed by the communication device 110 of FIG. 1.

The performing (S1520) the formation control for preventing the at least one of the vehicle or the other vehicles in the string from rollover may be performed by the processor 120 of FIG. 1.

As an example, the platooning control method may further include determining, by the processor 120, a risk of rollover of each of the vehicle and the other vehicles, based on a weight of each of trailer parts of the vehicle and the other vehicles.

As an example, performing (S1520) the formation control for preventing the at least one of the vehicle or the other vehicles in the string from rollover may include performing, by the processor 120, the formation control such that the vehicle is located in a direction where the crosswind blows with respect to another vehicle determined as having the highest risk of rollover among the other vehicles in the string to platoon and prevents the crosswind applied to the other vehicle.

As an example, the platooning control method may further include determining, by the processor 120, whether the vehicle and the other vehicles reach a rollover critical point, based on a weight applied to each wheel of trailer parts of the vehicle and the other vehicles.

As an example, the determining of whether the vehicle and the other vehicles reach the rollover critical point by the processor 120, based on the weight applied to each wheel of the trailer parts of the vehicle and the other vehicles may include determining, by the processor 120, that a vehicle determined that a weight applied to left wheels of the trailer part or a weight applied to right wheels of the trailer part is "0" reaches the rollover critical point.

As an example, performing (S1520) the formation control for preventing the at least one of the vehicle or the other vehicles in the string from rollover may include performing, by the processor 120, the formation control such that the vehicle is located in a direction where another vehicle which reaches the rollover critical point overturns due to the crosswind with respect to the other vehicle which reaches the rollover critical point among the other vehicles in the string to platoon and blocks the other vehicle from rollover.

As an example, performing the formation control by the processor 120 such that the vehicle is located in the direction where the other vehicle which reaches the rollover critical point overturns due to the crosswind with respect to the other vehicle which reaches the rollover critical point among the other vehicles in the string to platoon and blocks the other vehicle from rollover may include performing, by the processor 120, the formation control for blocking the other vehicle from rollover to maintain a range determined that a distance adjacent in the direction of the other vehicle which reaches the rollover critical point with respect to the vehicle is the same as a distance to a line adjacent in the direction of the vehicle with respect to the other vehicle which reaches the rollover critical point and that a driving speed of the vehicle and a driving speed of the other vehicle which reaches the rollover critical point are the same as each other.

As an example, embodiments of the platooning control method may further include sensing, by a wheel weight sensor, a weight applied to each wheel of the trailer part, obtaining, by a camera, an image in front of the vehicle, determining, by the processor 120, whether the vehicle is going straight, based on the image in front of the vehicle, and comparing, by the processor 120, a weight applied to left wheels of the trailer part with a weight applied to right wheels of the trailer part to determine at least one of whether a crosswind occurs or a direction of the crosswind, when it is determined that the vehicle is going straight in a state where a road where the vehicle is traveling is flat.

As an example, embodiments of the platooning control method may further include obtaining, by a steering angle sensor, a steering angle of the vehicle and determining, by the processor 120, at least one of whether a crosswind occurs or the direction of the crosswind with regard to the steering angle.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the platooning control apparatus and the method thereof according to an embodiment of the present disclosure.

According to at least one embodiment of the present disclosure, the platooning control apparatus and the method thereof may be provided to prevent the vehicle from rollover.

Furthermore, according to at least one embodiment of the present disclosure, the platooning control apparatus and the method thereof may be provided to allow the vehicle to detect crosswind by itself and cope with the detected crosswind in advance.

Furthermore, according to at least one embodiment of the present disclosure, the platooning control apparatus and the method thereof may be provided to prevent the autonomous vehicle in which the driver does not ride from rollover to ensure stability of autonomous driving.

Furthermore, according to at least one embodiment of the present disclosure, the platooning control apparatus and the method thereof may be provided to prevent the vehicle from rollover by means of platooning to enhance efficiency of the platooning.

Furthermore, according to at least one embodiment of the present disclosure, the platooning control apparatus and the method thereof may be provided to prevent an autonomous truck from rollover by means of a trailer part of the autonomous truck to enhance usability of the autonomous truck.

In addition, various effects ascertained directly or indirectly through the present disclosure may be provided.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. A platooning control apparatus, comprising:
a communication device provided in a vehicle that is platooning and configured to transmit and receive platooning information and information about a risk of rollover of the vehicle due to a crosswind with at least one other vehicle in a string of vehicles or an external server; and
a processor configured to perform formation control for preventing at least one of the vehicle or the other vehicles in the string from rollover such that the vehicle is located in a direction where the crosswind blows with respect to another vehicle determined as having the highest risk of rollover among the other vehicles in the string to platoon and prevent the crosswind applied to the other vehicle;
wherein the processor is further configured to:
determine whether the vehicle and the other vehicles reach a rollover critical point based on a weight applied to each wheel of the vehicle and the other vehicles; and
perform formation control such that the vehicle is located in a direction where an other vehicle that reaches the rollover critical point overturns due to the crosswind with respect to the other vehicle which reaches the rollover critical point among the other vehicles in the string to platoon and blocks the other vehicle from rollover.

2. The platooning control apparatus of claim 1, wherein each of the vehicle and the other vehicles in the string comprise a trailer part, and wherein the processor is configured to determine a risk of rollover of each of the vehicle and the other vehicles based on a weight of the trailer part of each of the vehicle and the other vehicles.

3. The platooning control apparatus of claim 1, wherein the processor is configured to perform formation control for preventing the crosswind when the vehicle is a vehicle determined as having the lowest risk of rollover among vehicles in the string.

4. The platooning control apparatus of claim 1, wherein each of the vehicle and the other vehicles in the string comprise a trailer part, and wherein the processor is configured to determine whether the vehicle and the other vehicles reach the rollover critical point based on a weight applied to each wheel of the trailer part of each of the vehicle and the other vehicles.

5. The platooning control apparatus of claim 4, wherein the processor is configured to determine that a vehicle determined that a weight applied to left wheels of the trailer part or a weight applied to right wheels of the trailer part is "0" reaches the rollover critical point.

6. The platooning control apparatus of claim 1, wherein the processor is configured to perform formation control for blocking the other vehicle from rollover when the vehicle is a vehicle determined as having the second lowest risk of rollover among vehicles in the string.

7. The platooning control apparatus of claim 1, wherein the processor is configured to perform formation control for blocking the other vehicle from rollover to maintain a range determined that a distance to a line adjacent in the direction of the other vehicle which reaches the rollover critical point with respect to the vehicle is the same as a distance to a line adjacent in the direction of the vehicle with respect to the other vehicle which reaches the rollover critical point and that a driving speed of the vehicle and a driving speed of the other vehicle which reaches the rollover critical point are the same as each other.

8. The platooning control apparatus of claim 1, wherein the vehicle comprises:
a trailer part and wherein the platooning control apparatus further comprises
a wheel weight sensor configured to sense a weight applied to each wheel of the trailer part; and
a camera configured to obtain an image in front of the vehicle;
wherein the processor is configured to:
determine whether the vehicle is going straight, based on the image in front of the vehicle; and compare a weight applied to left wheels of the trailer part with a weight applied to right wheels of the trailer part; and determine at least one of whether a crosswind occurs or a direction of the crosswind, when it is determined that the vehicle is going straight in a state where a road where the vehicle is traveling is flat.

9. The platooning control apparatus of claim 1, further comprising a steering angle sensor configured to obtain a steering angle of the vehicle, wherein the processor is configured to determine at least one of whether a crosswind occurs or a direction of the crosswind, with regard to the steering angle.

10. A platooning control method, comprising:

transmitting and receiving, by a communication device provided in a vehicle which is platooning, platooning information and information about a risk of rollover of the vehicle due to a crosswind with at least one of other vehicles in a string of the vehicle or an external server; and performing, by a processor, formation control for preventing at least one of the vehicle or the other vehicles in the string from rollover such that the vehicle is located in a direction where the crosswind blows with respect to another vehicle determined as having the highest risk of rollover among the other vehicles in the string to platoon and prevents the crosswind applied to the other vehicle;

wherein the method further comprises:

determining, by the processor, whether the vehicle and the other vehicles reach a rollover critical point based on a weight applied to each wheel of the vehicle and the other vehicles; and performing, by the processor, formation control such that the vehicle is located in a direction where an other vehicle that reaches the rollover critical point overturns due to the crosswind with respect to the other vehicle which reaches the rollover critical point among the other vehicles in the string to platoon and blocks the other vehicle from rollover.

11. The platooning control method of claim 10, wherein each of the vehicle and the other vehicles in the string comprise a trailer part, and wherein the method further comprises determining, by the processor, a risk of rollover of each of the vehicle and the other vehicles based on a weight of the trailer part of each of the vehicle and the other vehicles.

12. The platooning control method of claim 10, wherein each of the vehicle and the other vehicles in the string comprises a trailer part, and wherein the method further comprises determining, by the processor, whether the vehicle and the other vehicles reach the rollover critical point, based on a weight applied to each wheel of the trailer part of each of the vehicle and the other vehicles.

13. The platooning control method of claim 12, wherein determining whether the vehicle and the other vehicles reach the rollover critical point further comprises, by the processor, determining that a vehicle determined that a weight applied to left wheels of the trailer part or a weight applied to right wheels of the trailer part is "0" reaches the rollover critical point.

14. The platooning control method of claim 10, wherein performing the formation control such that the vehicle is located in the direction where the other vehicle which reaches the rollover critical point overturns due to the crosswind with respect to the other vehicle which reaches the rollover critical point among the other vehicles in the string to platoon and blocks the other vehicle from rollover comprises performing, by the processor, the formation control for blocking the other vehicle from rollover to maintain a range determined that a distance to a line adjacent in the direction of the other vehicle which reaches the rollover critical point with respect to the vehicle is the same as a distance to a line adjacent in the direction of the vehicle with respect to the other vehicle which reaches the rollover critical point and that a driving speed of the vehicle and a driving speed of the other vehicle which reaches the rollover critical point are the same as each other.

15. The platooning control method of claim 10, wherein the vehicle comprises a trailer part, and the method further comprises:

sensing, by a wheel weight sensor, a weight applied to each wheel of the trailer part;

obtaining, by a camera, an image in front of the vehicle;

determining, by the processor, whether the vehicle is going straight based on the image in front of the vehicle; and comparing, by the processor, a weight applied to left wheels of the trailer part with a weight applied to right wheels of the trailer part to determine at least one of whether a crosswind occurs or a direction of the crosswind, when it is determined that the vehicle is going straight in a state where a road where the vehicle is traveling is flat.

16. The platooning control method of claim 10, further comprising:

obtaining, by a steering angle sensor, a steering angle of the vehicle; and determining, by the processor, at least one of whether a crosswind occurs or a direction of the crosswind, with regard to the steering angle.

* * * * *